Aug. 12, 1952          L. VITA          2,606,607

WINDOW

Filed Dec. 28, 1949          5 Sheets-Sheet 2

INVENTOR.
LAWRENCE VITA
BY Edward Thomas
ATTORNEY.

Aug. 12, 1952 — L. VITA — 2,606,607
WINDOW
Filed Dec. 28, 1949 — 5 Sheets-Sheet 3

INVENTOR.
LAWRENCE VITA
BY Edward Thomas
ATTORNEY.

Aug. 12, 1952 L. VITA 2,606,607
WINDOW
Filed Dec. 28, 1949 5 Sheets-Sheet 4

INVENTOR.
LAWRENCE VITA
BY Edward Thomas
ATTORNEY.

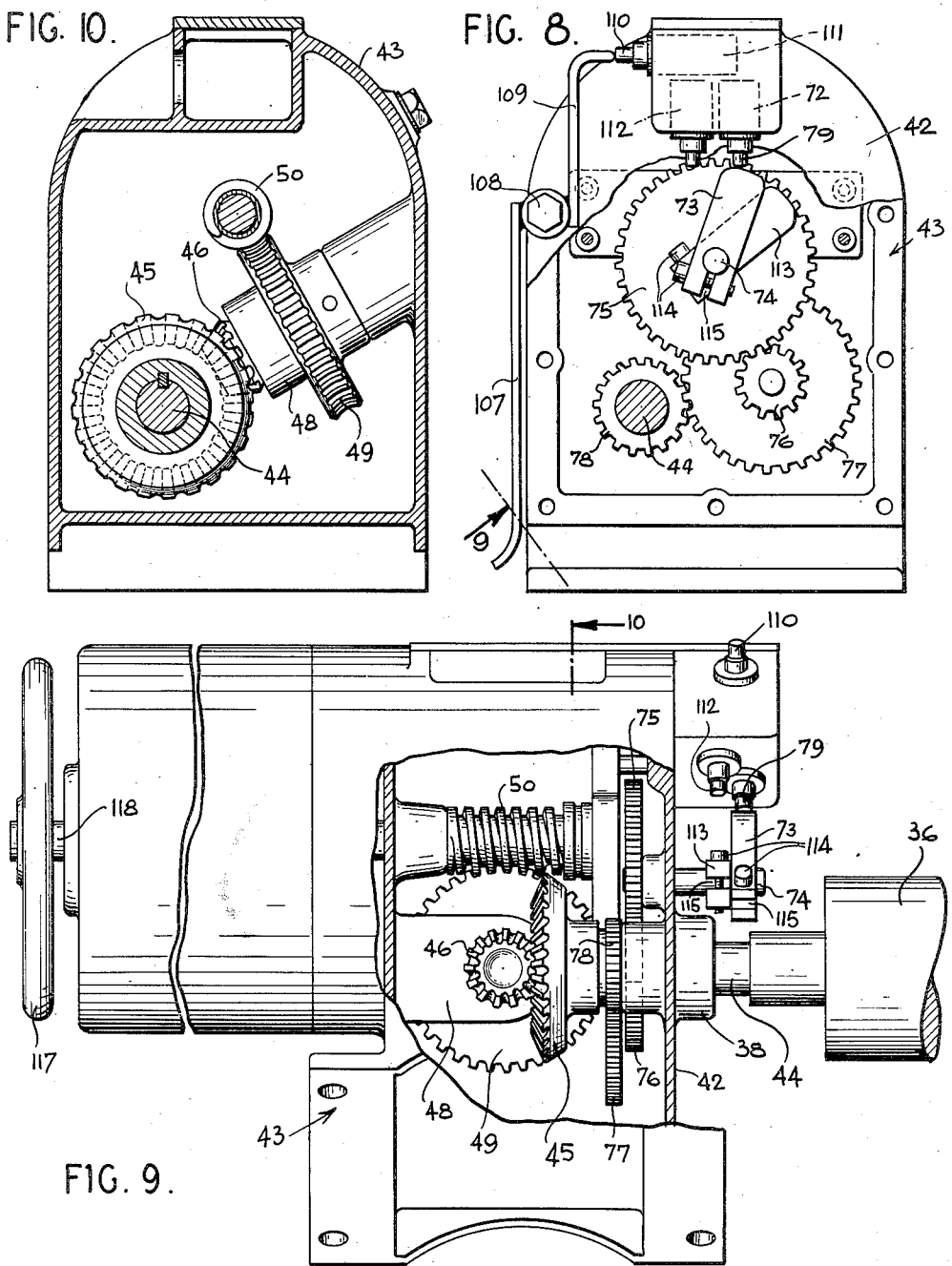

Patented Aug. 12, 1952

2,606,607

UNITED STATES PATENT OFFICE 2,606,607

WINDOW

Lawrence Vita, Smithtown Branch, N. Y.

Application December 28, 1949, Serial No. 135,399

16 Claims. (Cl. 160—27)

This invention relates to windows and is herein illustrated in some detail as embodied in a so-called picture window, in which the glass of the window is slidable, so as to enable air to enter when the glass has been moved away from the opening of the window frame.

Picture windows to provide a wide and high view of the outer landscape are common especially in country houses of the better class and in the larger summer houses, but they have been unsatisfactory in that they usually were glazed with fixed window panes and, therefore, could not be opened. Thus the whole large area of the window space was permanently closed against admitting fresh air, and against any other ventilation.

It had been found that slidable sash of such windows were too heavy for the average householder to raise and lower even when counterbalanced.

Moreover, the large area of glass provided so much cooling surface that the picture window noticeably raised the cost of heating the house in cold weather and moreover created local drafts which were uncomfortable.

To reduce this chilling effect, picture windows have been glazed with double glass, two lights separated by a space, preferably a vacuum space, but this doubled the weight, or more than doubled the weight, so that proposals to mount the doubled glass in a slidable sash, were even less attractive by reason of the weight to be moved.

Thus, there seemed to be no prospect that an openable picture window, usually weighing 165 pounds or more, could be made practicable for household use.

In addition to the foregoing difficulties, it was found that weatherstripping which bore against the glass surface streaked the glass when the glass was lifted or lowered, yet weatherstripping was essential.

According to the present invention, the foregoing and other difficulties and objections are overcome and a simple, economical operable picture window is provided, which can be built of easily standardized parts and commercially available units, is adapted to be power operated, and is well adapted to be erected in place by mechanics of ordinary skill.

The glass may consist of a double unit with the two layers spaced apart with an intervening vacuum, such as is commercially available, and the unit may be suspended by a wire fly netting, such as bronze, and be carried by a rotatable roller, and may run in simple channels.

The roller may be rotated by a standard electric motor forming part of a commercially available power unit. The bearings of the roller may rest on the house frame and be held aligned by a light channel bar.

The motor drive is easily controlled so as to permit the window to be raised or lowered at will and to be arrested and held at any desired height, and to automatically stop the motor at either end of the travel of the window, or may be stopped at will at intermediate points.

Preferably, the motor and its driving connections and the automatic arresting devices are built into a single unit, so that the unit may be shipped ready for connection to the movable parts and to the power line.

In the form shown in some detail, the device is adapted to be operated by a standard form of alternating current motor and as including devices to protect the motor from over-heating as might happen if the movable glass is held against travel by ice, which freezes it to the guides in which it normally travels.

The motor shown is reversible by reversing the current, thus avoiding any need for reversing devices, and making it possible to start and stop the moving heavy glass without shocks and at speeds controlled by the momentum or inertia of the moving motor element.

It is found that streaking of the glass by water, such as rain, may be almost wholly prevented by providing special weatherstripping. The most satisfactory weatherstripping seems to be strips of pile fabric carried by the glass mounting with the pile adapted to rub against the fixed members of the window frame.

Other features and advantages will hereinafter appear.

In the accompanying drawings:

Fig. 8 is an enlarged view of the motor control, with the outside housing largely broken away.

Fig. 9 is a view of the parts of Fig. 8 as seen from the arrow 9 on Fig. 8.

Fig. 10 is a section on the line 10—10 of Fig. 9.

Figure 6:
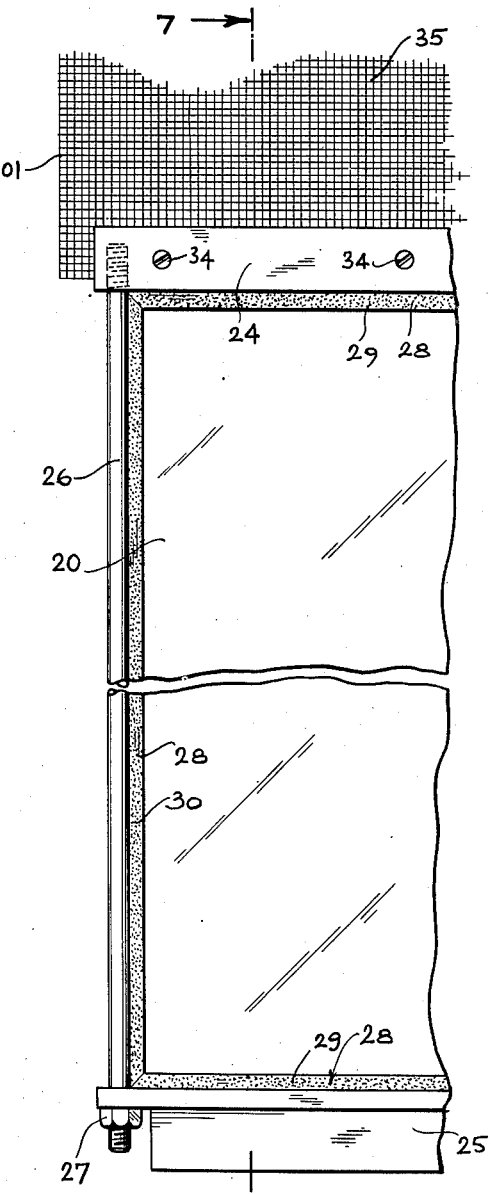
Fig. 6 is an enlarged fragmentary view of the mounted glass.

The structure shown includes a double glass 20, consisting of two lights 21, 22, separated by factory built-in edge spacing strips 23, so as usually to include a vacuum between the lights 21, 22, and the glass 20 is shown particularly in Fig. 6, as held between an upper cross-bar 24 and a lower T-shaped cross-bar 25, which are united by side rods 26, shown as screwed into the upper cross-bar 24 and drawing on the lower cross-bar 25 by nuts 27 threaded on to the rods 26 below the lower cross-bar 25.

In the form shown, a U-shaped velvet covered metal channel member 28 lies between each cross-bar and the edge of the double glass 20; the projecting resilient pile 29 of the velvet serves to bear more or less gently against the fixed guides to be later described.

The channel member 28 also embraces the vertical edges 30 of the glass 20, holding the member 28 close against the glass, and further kept in place by the rods 26.

The upper cross-bar 24 is shown as built of two separate bars 32, 33 held together by screws 34 to clamp between the bars 32, 33, the lower end of a wire fly netting 35, usually of bronze, by which the glass 20 is suspended from a power-driven overhead roller 36, so that the tension of the heavy glass always holds the netting flat and free from kinks and bulges.

Figures 2, 3, 7:
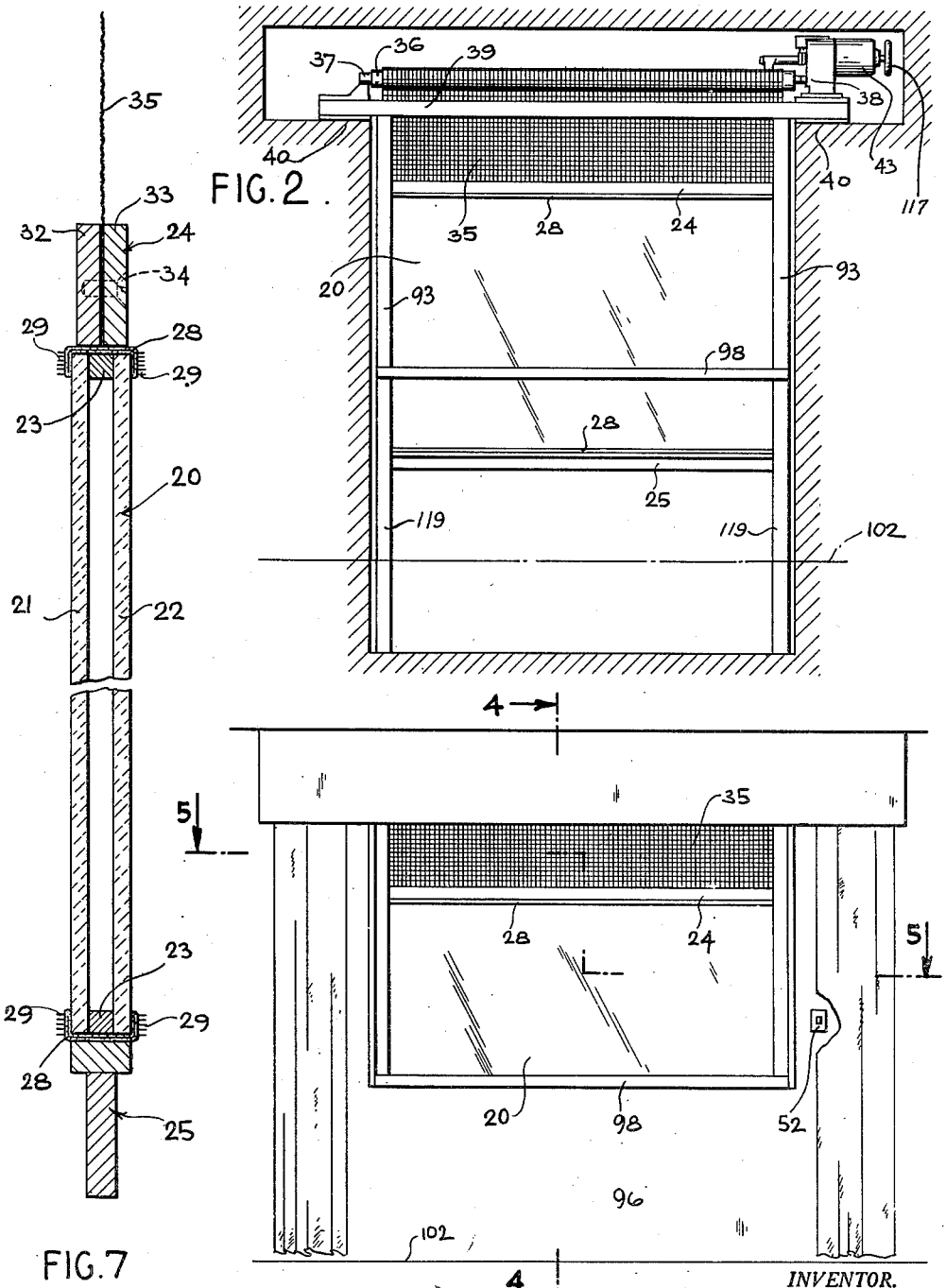
Fig. 2 is an outside view of the same in place with the house wall partly broken away.
Fig. 3 is a similar inside view on an enlarged scale and broken away at the bottom.
Fig. 7 is a broken section on the line 7—7 of Fig. 6.

As seen in Figure 2, the roller 36 turns on bearings 37 and 38, to lift or lower the glass 20.

For convenience in erecting, the bearings 37 and 38 are shown as carried by a light channel bar 39, so they need no realigning after being assembled at the factory, but each bearing is shown at its end of the bar 39 where the bar 39 rests upon the house wall or frame 40.

Thus, the bars 39 transmit the load on the bearings 37, 38 vertically to the house wall or frame 40.

Figure 4:
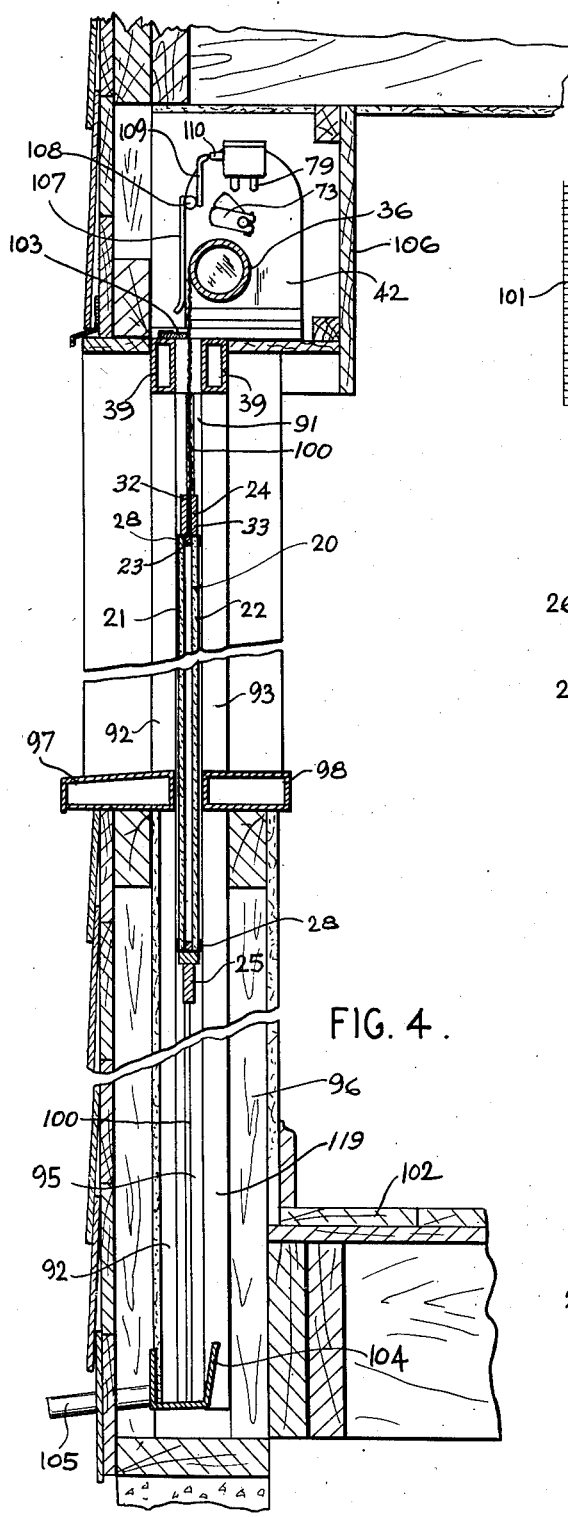
Fig. 4 is a section on the line 4—4 of Fig. 3.

In Figs. 2 and 4 the bearing 38 of the roller 36 is shown as one wall 42 of the motor housing 43, through which the shaft 44 of the roller 36, or an extension thereof, extends.

In Figs. 9 and 10 the shaft 44 is shown as driven by a large bevel gear 45 geared to the motor through a small bevel gear 46 journalled on a lug 48.

The small bevel gear 46 turns with a worm wheel 49 on the other side of the lug 48, and the worm wheel meshes with a worm 50 turning with the motor shaft 51 and turned by it.

The worm wheel 49 and its worm 50 hold the glass 20 locked wherever the motor holds it at the moment the motor stops. Several types of suitable motors are available.

Figure 11:
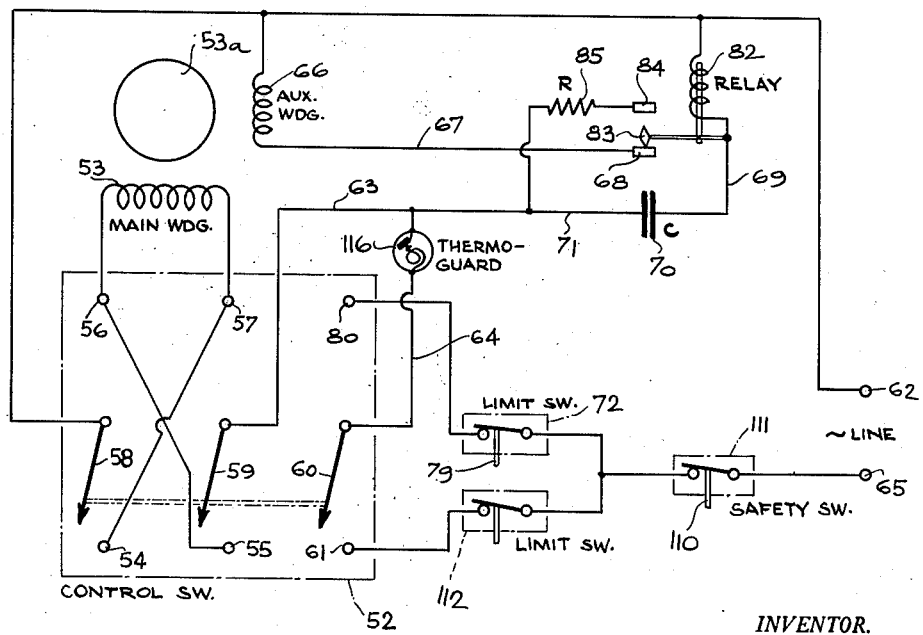
Fig. 11 is a wiring diagram of the electrical structure shown.

The motor shown, which could be an A. C. motor of suitable type, is adapted to be driven by suitable current in either direction as determined by a three-way manually operable reversing switch 52 with an off position, operating through connections such as those diagrammatically illustrated in the electrical diagram, Fig. 11. That diagram shows the switch set in neutral or off position. A reversible motor is preferable to any gear shifting arrangement, for the reason that a gear shifting device involves sudden starting and stopping, thus throwing strains on the supports and connections and netting, by which the heavy glass is carried.

In the form shown in some detail, by way of illustration, the motor includes a main winding 53 connected at its ends to terminals 54, 55 of the switch 52 and also to crossed terminals 56 and 57 of said switch.

When the shiftable switch arms 58, 59, 60 are in contact with terminals 54, 55 and 61, the current flows in one direction (at each cycle) through the main winding 53 adjacent the unwound magnetic armature 53a from the main 62, arm 58 and terminal 54 and out through terminal 55, arm 59, conductor 63, then conductor 64 to arm 60, terminal 61 to its opposite main 65.

At the same time, current is flowing in the same direction (at each cycle) through the auxiliary or starting winding 66, from the main 62 and out through the conductor 67, relay contact 68, conductor 69, condenser 70, and conductor 71 to conductor 64, and so to main 65.

In order to automatically arrest the window as it travels down there is shown a limit switch 72 adapted to be opened by an arm 73 adjustably settable on a stub shaft 74 journalled in the housing 43 and geared by reducing gears 75, 76, 77 and 78 to revolve less than one turn in the travel of the glass 20. For this purpose, the small gear 78 is fast on the shaft 44 of the roller 36.

When the arm 73 reaches the upper position, seen in Fig. 8, it is camming the switch 72 open, by pressing on the button 79, which operates the switch 72.

Figure 1:
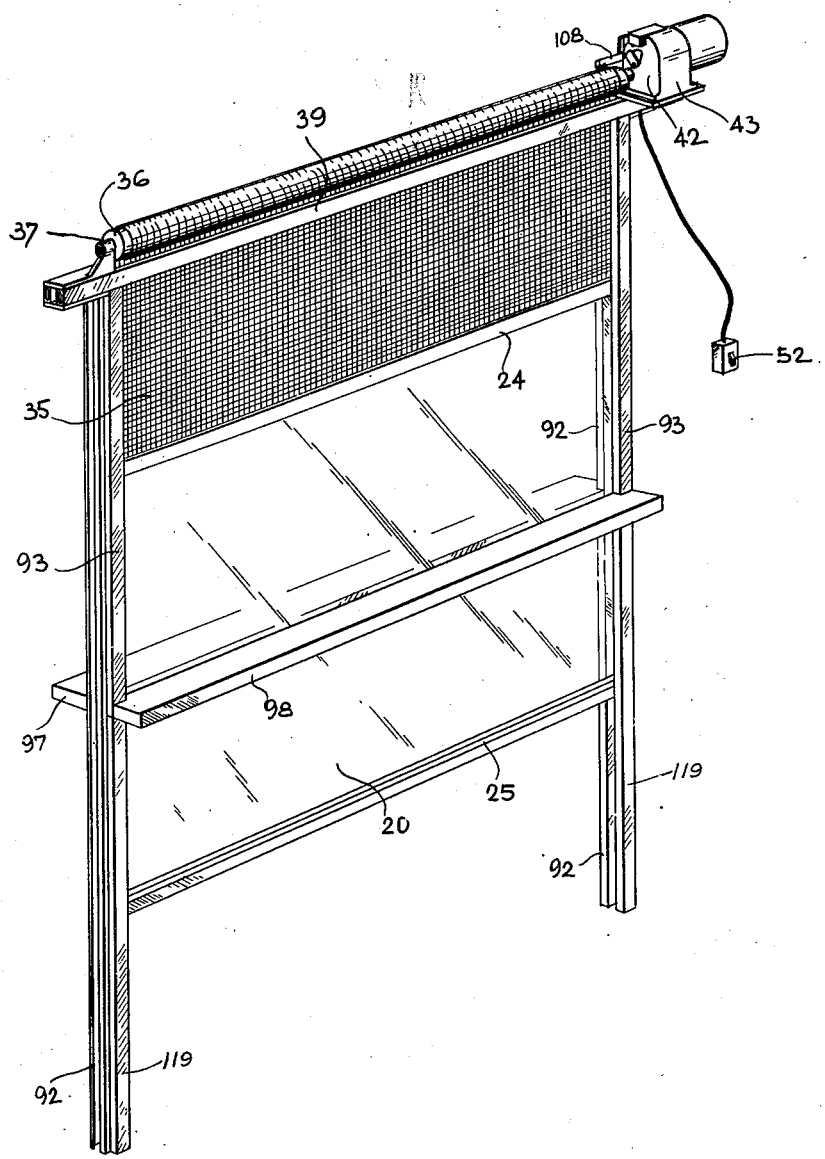
Fig. 1 is a perspective view of one form of the window elements.

When the control switch 52 of Fig. 1 is swung to lower position, seen in Fig. 1, it carries the arms 58, 59, 60 to contact with the terminals 56, 57 and 80, thus reversing the current in the main winding 53.

The current in the auxiliary winding 66 goes in the same direction. Thus the motor armature 81 turns in the opposite direction. The relay 82 between the main 62 and conductor 69 cuts the current out of the auxiliary winding almost at once, that is, after starting the motor armature. Thus, the auxiliary winding is normally idle. To prevent sparking when the contact 68 is broken by upswing of the arm 83, the arm 83 contacts a second contact 84 connected by a resistance 85 (say 3 ohms) to the conductor 63 beyond the condenser 70.

Figure 5:
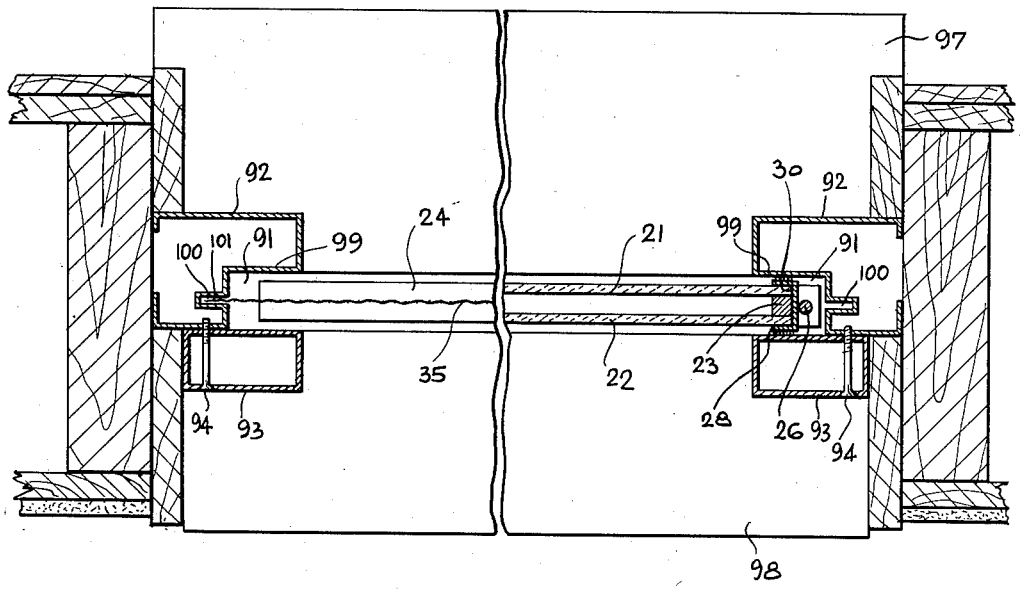
Fig. 5 is a section on the line 5—5 of Fig. 3.

As the window moves up or down, it slides in an opening 91, Figures 4 and 5, formed between an outside channel bar 92, and an inside channel bar 93 removably held as by screws 94 to the outside bar 92.

As seen in Figure 4, the outside channel bar 92 extends from the bottom of the channel bar 39 down to the bottom of the well 95 within the wall 96 of the house into which the glass 20 descends when the flyscreen 35 comes down, descending until the top of the top cross bar 24 is level with the tops of the channel bars 97, 98 which form the window sill.

The inside channel bar 93 preferably ends, see Fig. 1, at the top of the sill 98, so that it is readily removable, if need be. An outside channel bar preferably includes a flange 99 to form one side of the channel 91, and its body extends from the flange 99 toward the bar 93, including a narrow deepened slot or channel 100, which provides a channel in which the outer edge 101 of the flyscreen 35 slides, projecting as it does about an inch beyond the lateral edge of the glass 20.

Thus screen 35 effectively closes the window opening against entering insects. To prevent entrance of insects over the roller 36, the outer top channel bar 39 is shown as carrying a strip of felt 103 adapted to extend to and brush the screen 35 as it passes.

The velvet pile 29 of the channel member 28 closes the opening between channel bars 39, the latter lying near and parallel to the channel cross-bars 39.

Likewise, the velvet pile 29 closes the space between the sill members 97, 98 and the between sides of the opening 91. Thus there is no weatherstripping to bear against the glass, and nothing to rub dirt over its surface.

The device is herein illustrated as set in an ordinary type of wood frame house, and the well 95 extends below the usual floor 102, and there is ample space in such a well for a bottom gutter 104 to catch any rain water flowing down the window, and to deliver it outside through a short pipe 105.

There is ample space for the motor casing 43 behind an ordinary valence 106.

To prevent injury by buckling of the netting 35 if the glass 20 is held by ice so that it fails to descend when the motor is started to drop the glass, there is provided a detector lever 107, Figure 4, fast on a shaft 108, which projects over the face of the netting 35 from the gear housing 43 and is pressed by any bulging of the netting to turn the shaft 108 and swing its rock arm 109 against the button 110 of the safety switch 111.

One limit switch 72 was described above. The limit switch 112 Figure 8 is similarly operated by an adjustable arm 113 fast on the shaft 74, which carries the arm 73.

These arms 73 and 113 are shown as adjustable by releasing screws 114 which may be tightened to draw together the split end 115 of either arm 73 and 113.

The device may also include a thermostatic switch device 116 to break the current if the motor overheats by failure to move the window if it becomes frozen in place.

The device may include a hand wheel 117 on an extension 118 of the motor shaft for lifting the glass by manually turning that shaft if power fails, and also to turn it to release the safety switch 111 if the switch has been opened by the upper cross-bar striking the arm 107 as the glass rises and the limit switch 112 has failed to arrest the motor.

The two bars 93 taken with the bar 98 preferably form a separable U-shaped unit, and the glass is guided below the sill 98 by vertical bars 119 which extend downward from the sill 98, functioning as extensions of the bars 93.

Having thus described certain embodiments of the invention in some detail, what is claimed is:

1. In a window having a movable heavy pane of glass, a metal netting supporting the glass by its upper edge, a roller on which the netting winds to lift the glass, a motor adapted to turn the roller, an electric circuit driving the motor, switches for the circuit, the combination of operating arms to open the switches at the limits of travel of the glass, and a shaft geared to the roller carrying the arms.

2. In a window having a movable heavy pane of glass, a metal netting supporting the glass by its upper edge, a roller on which the netting winds to lift the glass, a motor adapted to turn the roller, an electric circuit driving the motor, switches for the circuit, the combination of operating arms to open the switches at the limits of travel of the glass, and a shaft geared to the roller on which the arms are adjustably mounted.

3. In a window having a movable heavy pane of glass, a metal netting supporting the glass by its upper edge, a roller on which the netting winds to lift the glass, a motor adapted to turn the roller, a worm and worm wheel by which the motor turns the roller, an electric circuit driving the motor, switches for the circuit, the combination of operating arms to open the switches at the limits of travel of the glass, and a shaft geared to the roller carrying the arms.

4. The combination with an outside house wall having a window opening, of a heavy glass pane adapted to close the window, a metal netting supporting the glass, a framework surrounding the glass, by which the netting carries it, a frame lining the window opening, and resilient weatherstripping carried by both faces of the glass framework and adapted to bear against the opening framework to close the space between the glass and opening at the sides and bottom of the glass.

5. The combination with an outside house wall having a window opening, of a heavy glass pane adapted to close the window, a metal netting supporting the glass, a framework surrounding the glass, by which the netting carries it, a frame lining the window opening, and resilient weatherstripping carried by both faces of the glass framework and adapted to bear against the opening framework to close the space between the glass and opening at the sides and bottom of the glass, a roller on which the netting adapted to wind to lift the glass, and means for turning the roller to lift the glass.

6. The combination with an outside house wall having a window opening, of a heavy glass pane adapted to close the window, a metal netting supporting the glass, a framework surrounding the glass, by which the netting carries it, a frame lining the window opening, and a pile fabric faced weather-stripping carried by both faces of the glass framework and adapted to bear against the opening framework to close the space between the glass and opening at the sides and bottom of the glass.

7. The combination with a frame adapted to fit in the window opening of an outside house wall, of a heavy glass adapted to close the opening and slidable vertically in the frame, a metal netting supporting the glass, a roller on which the netting is adapted to wind, said netting becoming bulged by turning of the roller to lower the glass when the glass fails to lower, electric connections for driving the roller to raise and lower the glass, a safety switch in said electric connections, an arm pivoted near the roller and adjacent the netting, and connections operated by the arm to open said switch by bulging of the netting.

8. The combination with a frame adapted to fit in the window opening of an outside house wall, of a heavy glass adapted to close the opening and slidable vertically in the frame, a metal netting supporting the glass, a roller on which the netting is adapted to wind, said netting becoming bulged by turning of the roller to lower the glass when the glass fails to lower, electric connections for driving the roller to raise and lower the glass, a safety switch in said electric connections, and an arm pivoted adjacent the netting and the switch, and connections operated by the arm to open said switch by bulging of the netting.

9. The combination with a main frame having top and bottom cross bars and vertical side bars, of a heavy glass slidable vertically in the frame adapted to close the opening of the frame, a metal glass frame enclosing the top and bottom and sides of the glass, a metal netting gripped by the glass framework and supporting the glass to raise and lower it, and resilient weather-stripping carried by both faces of the glass framework and bearing against the bars at the sides and bottom of the main frame when the glass completely closes the window.

10. The combination with a frame adapted to fit in the window opening of an outside house wall, of a heavy glass adapted to close the opening and slidable vertically in the frame, a metal netting supporting the glass, a roller on which the netting is adapted to wind, said netting becoming bulged by turning of the roller to lower the glass when the glass fails to lower, electric connections for driving the roller to raise and lower the glass, a safety switch in said electric connections, an arm pivoted near the roller and adjacent the netting, connections operated by the arm to open said switch by bulging of the netting and a safety switch adapted to break the connections if the activated motor fails to raise the locked glass.

11. The combination with a main frame having inside and outside top and bottom cross bars and inside and outside vertical side bars, of a heavy glass adapted to move to close the opening and slidable vertically in the frame, a metal glass frame enclosing the top and bottom and sides of the glass, a metal netting gripped by the glass framework and supporting the glass to raise and lower it and pile fabric faced resilient weather-stripping carried by both faces of the glass framework and bearing against the bars of the main frame at the sides and bottom of the glass when the glass completely closes the window.

12. The combination with a frame adapted to fit in the window opening of an outside house wall, of a heavy glass adapted to close the opening and slidable vertically in the frame, a metal netting supporting the glass, a roller on which the netting is turnable to lower the glass, said netting becoming bulged by turning of the roller to lower the glass when the glass fails to lower, electric connections for driving the roller to raise and lower the glass, adjustable devices for breaking said connections at each end of the travel of the glass, a safety switch in said electric connections, an arm adjacent the netting, and connections operated by the arm to open said switch by bulging of the netting.

13. The combination with a frame adapted to fit in a window opening of an outside house wall, of heavy glass adapted to close the opening and slidable vertically in the frame, a metal netting supporting the glass, a roller on which the netting is adapted to wind and which is adapted to be turned to lower the glass, said netting becoming bulged by turning of the roller to lower the glass when the glass fails to lower, electric connections for driving the roller to raise and lower the glass, a safety switch in said electric connections, and an arm pivoted to lie adjacent the netting, connections operated by the arm to open said switch by bulging of the netting, a safety switch adapted to break the connections if electric current in the motor fails to raise the glass, and a single unit carrying said breaking connections and switch.

14. The combination with a frame adapted to fit in a window opening of an outside house wall, of a heavy glass adapted to close the opening and slidable vertically in the frame, a metal netting supporting the glass, a roller on which the netting is adapted to wind and which is adapted to be turned to lower the glass, said netting becoming bulged by turning of the roller to lower the glass when the glass fails to lower, electric connections for driving the roller to raise and lower the glass, a safety switch in said electric connections, and an arm pivoted to lie adjacent the netting, connections operated by the arm to open said switch by bulging of the netting, and a safety switch adapted to break the connections if electric current in the motor fails to raise the glass, a single unit carrying said breaking connections and switch, bearings for the roller, and a single bar carrying the bearings and the said unit.

15. In a power operated window, the combination with a motor and glass movable in the window, connections between the motor and glass including gearing, a roller driven by the gearing, a travelling screen wound on the roller, of a travelling frame by which the screen holds the glass, said screen and frame being deflectable from the normal path of travel, electrical conductors carrying current to the motor, limit switches in said conductors to arrest the motor at the limits of travel of the window, a safety switch in said conductors to arrest the motor, and an arm adjacent the path of travel of said screen and frame and operating the safety switch when either the frame or the screen leaves its normal path of travel.

16. In a power operated window, the combination with a motor and a glass movable in the window, of a roller driven by the motor, a screen wound on the roller and raising and lowering the glass, electrical conductors carrying current to the motor, limit switches in said conductor to arrest the motor when the turning roller carries the glass to the proper limits of its travel, a safety switch in said conductors to arrest the motor, an arm operated by travel of the glass to open the safety switch, and means to turn the roller to remove the glass from the arm.

LAWRENCE VITA.

REFERENCES CITED

The following references are of record in the file of this patent:

UNITED STATES PATENTS

| Number | Name | Date |
|---|---|---|
| 2,492,721 | Vita | Dec. 27, 1949 |